(12) United States Patent
Kao et al.

(10) Patent No.: US 11,615,608 B2
(45) Date of Patent: Mar. 28, 2023

(54) IMAGE OBTAINING METHOD

(71) Applicant: INDUSTRIAL TECHNOLOGY RESEARCH INSTITUTE, Hsinchu (TW)

(72) Inventors: Tsai-Ling Kao, Tainan (TW); Kai-Shiang Gan, Tainan (TW); Hian-Kun Tenn, Tainan (TW); Wei-Shiang Huang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 77 days.

(21) Appl. No.: 17/244,810

(22) Filed: Apr. 29, 2021

(65) Prior Publication Data
US 2022/0207283 A1 Jun. 30, 2022

(30) Foreign Application Priority Data
Dec. 29, 2020 (TW) .................................. 109146576

(51) Int. Cl.
*G06V 10/75* (2022.01)
*G06V 10/60* (2022.01)
(Continued)

(52) U.S. Cl.
CPC .............. *G06V 10/60* (2022.01); *G06T 5/009* (2013.01); *G06T 5/50* (2013.01); *G06T 7/521* (2017.01); *G06V 10/751* (2022.01)

(58) Field of Classification Search
CPC .... G06V 10/60; G06V 10/751; G06V 10/141; G06V 10/16; G06V 2201/06; G06T 5/009; G06T 5/50; G06T 7/521
See application file for complete search history.

(56) References Cited

U.S. PATENT DOCUMENTS 9,813,150 B1    11/2017  Bitra et al.
9,863,767 B2 *   1/2018  Fuchikami ........... G01B 11/026
                         (Continued)

FOREIGN PATENT DOCUMENTS

CN        107193123 A      9/2017
CN        107798698 A      3/2018
                (Continued)

OTHER PUBLICATIONS

TW Office Action in Application No. 109146576 dated Sep. 6, 2021.
(Continued)

*Primary Examiner* — Matthew C Bella
*Assistant Examiner* — Kathleen M Broughton
(74) *Attorney, Agent, or Firm* — Maschoff Brennan

(57) ABSTRACT

An image obtaining method comprises: by a projecting device, separately projecting an image acquisition light and a reference light onto a target object, wherein the light intensity of the image acquisition light is higher than the light intensity of the reference light; by an image obtaining device, obtaining a first image and a second image, both the first image and the second image comprising the image of the target object, with the target object of the first image being illuminated by the image acquisition light, and the target object of the second image being illuminated by the reference light, wherein the first image has a first area including a part of the target object, and the second image has a second area including the part of the target object; and by a computing device, performing a difference evaluation procedure to obtain a required light intensity based on a required amount.

15 Claims, 4 Drawing Sheets

(51) Int. Cl.
  *G06T 7/521* (2017.01)
  *G06T 5/00* (2006.01)
  *G06T 5/50* (2006.01)

(56) References Cited

U.S. PATENT DOCUMENTS

| | | | |
|---|---|---|---|
| 10,306,152 | B1 | 5/2019 | Chu et al. |
| 10,368,053 | B2 | 7/2019 | Martinez Bauza et al. |
| 2015/0212652 | A1* | 7/2015 | Lin .................. G06V 40/28 345/175 |
| 2015/0233707 | A1 | 8/2015 | Huntley et al. |
| 2018/0025475 | A1* | 1/2018 | Kato .................. H04N 5/2256 348/241 |
| 2018/0365821 | A1 | 12/2018 | Uemura |
| 2019/0108646 | A1 | 4/2019 | Wang et al. |

FOREIGN PATENT DOCUMENTS

| | | | |
|---|---|---|---|
| CN | 109085171 | A | 12/2018 |
| CN | 105872392 | B * | 1/2019 |
| CN | 109716677 | A | 5/2019 |
| CN | 110686599 | B | 7/2020 |
| CN | 111612737 | A | 9/2020 |
| CN | 111899310 | A | 11/2020 |
| JP | 2016178600 | A * | 10/2016 |
| TW | 201519111 | A | 5/2015 |
| TW | 201915944 | A | 4/2019 |
| TW | 201935116 | A | 9/2019 |

OTHER PUBLICATIONS

Zhaojie et al., "A Shape Measurement Method Based on Automatic Multiple Exposure Surface Structured Light" ACTA OPTICA SINICA, vol. 38, No. 11, Nov. 2018.

Ekstrand et al., "Autoexposure for three-dimensional shape measurement using a digital-lightprocessing projector" Optical Engineering, Dec. 2011.

Jiang et al., "High dynamic range real-time 3D shape" Optics Express, vol. 24, No. 7, Mar. 28, 2016.

* cited by examiner

IMAGE OBTAINING METHOD

CROSS-REFERENCE TO RELATED APPLICATIONS

This non-provisional application claims priority under 35 U.S.C. § 119(a) on patent application No(s). 109146576 filed in Republic of China (ROC) on Dec. 29, 2020, the entire contents of which are hereby incorporated by reference.

BACKGROUND

1. Technical Field

This disclosure relates to an image obtaining method, especially to an image obtaining method for obtaining optimal images for different workpieces and surfaces of different materials.

2. Related Art

A general production line has various types of workpieces, and the method of detecting or positioning these workpieces is usually to obtain images of the workpieces and perform three-dimensional point cloud reconstruction on the images. Since the materials of the workpiece are different, even if the materials are illuminated by a light with the same intensity, the materials will still have different reflectance or absorbance. Therefore, when it is desired to use a camera to image a workpiece on a production line and perform 3D point cloud reconstruction, the parameters for imaging different workpieces need to be adjusted individually to obtain images that are more suitable for 3D point cloud reconstruction.

Currently, the method for individually adjusting the imaging parameters of the camera for different workpieces is mostly manual adjustment. That is, the user usually determines the appropriate imaging parameters based on his/hers past experiences. For example, when the workpiece has a reflective surface, the user will reduce the exposure time of the camera or reduce the amount of light projected by the light projector. On the contrary, when the workpiece has a light-absorbing surface, the user will increase the exposure time of the camera or increase the amount of light projected by the light projection device to obtain an image suitable for 3D point cloud reconstruction.

SUMMARY

Accordingly, this disclosure provides an image obtaining method that adaptively adjusts the amount of light projected by the light projection device for workpieces with different materials, colors, etc., so as to obtain images suitable for 3D point cloud reconstruction.

According to one or more embodiment of this disclosure, an image obtaining method, comprising: by a projecting device, separately projecting an image acquisition light and a reference light onto a target object, wherein a light intensity of the image acquisition light is higher than a light intensity of the reference light; by an image obtaining device, obtaining a first image and a second image, both the first image and the second image comprising the image of the target object, with the target object of the first image being illuminated by the image acquisition light, and the target object of the second image being illuminated by the reference light, wherein the first image has a first area including a part of the target object, and the second image has a second area including the part of the target object; and by a computing device, performing a difference evaluation procedure, the difference evaluation procedure comprising: comparing a plurality of first pixels in the first area with a plurality of second pixels in the second area, with the plurality of second pixels corresponding to the plurality of first pixels, to obtain a plurality of differences; using one or more of the first pixels as an output image of the part of the target object, wherein one or more of the differences, corresponding to the one or more first pixels serving as the output image, meet a difference standard respectively; and obtaining and selectively outputting a required light intensity based on a required amount, wherein a sum of the required amount and the amount of the one or more differences meeting the difference standard falls within a threshold range.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

The image obtaining method of the present disclosure is adapted to the following two conditions. Condition one is to first project an image acquisition light and a reference light onto a target object to obtain two images corresponding to the two light, then determine whether the projecting parameters of the projecting device need to be adjusted based on the two images. Condition two is to project a plurality of image acquisition lights with different intensities and the reference light onto the target object in advance to obtain multiple images corresponding the intensities of the plurality of image acquisition lights, then determine whether one of the images meets the usage requirement, and obtain another image from these images when said image does not meet the usage requirement, wherein the intensities of the plurality of image acquisition lights is, for example, increasing or decreasing in a predetermined interval.

Condition one will first be described in the following.

Figure 1A:
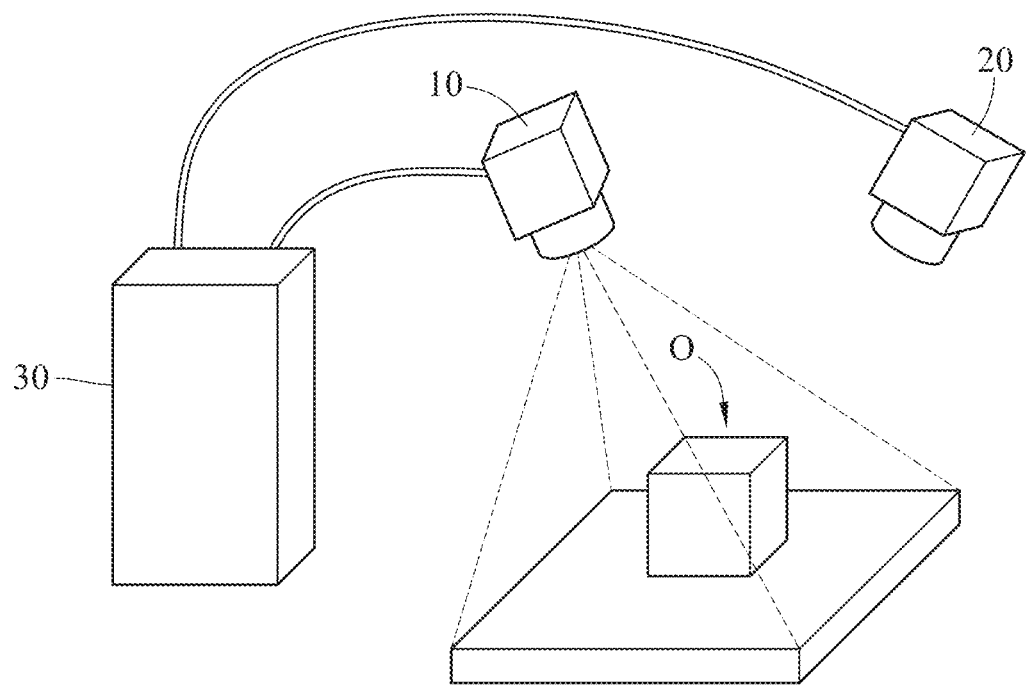
FIG. 1A is a schematic diagram illustrating an image obtaining system for performing an image obtaining method according to one or more embodiments of the present disclosure.

Please refer to FIG. 1A, FIG. 1A is a schematic diagram illustrating an image obtaining system for performing an image obtaining method according to one or more embodiments of the present disclosure. The image obtaining system adapted to perform the image obtaining method of the present disclosure preferably comprises a projecting device 10, an image obtaining device 20 and a computing device 30, wherein the computing device 30 is in signal transmittable wired or wireless connection with the projecting device 10 and the image obtaining device 20. The projecting device 10 shown in FIG. 1 is, for example, a projecting device that projects Gray structured light; the image obtaining device 20 is, for example, an image obtaining device of structured light; the computing device 30, is for example, a processor or other device with computing function. The number of the projecting device 10 and the image obtaining device 20 may be one or more. The present disclosure does not limit the implementation of the image obtaining system.

Figure 1B:
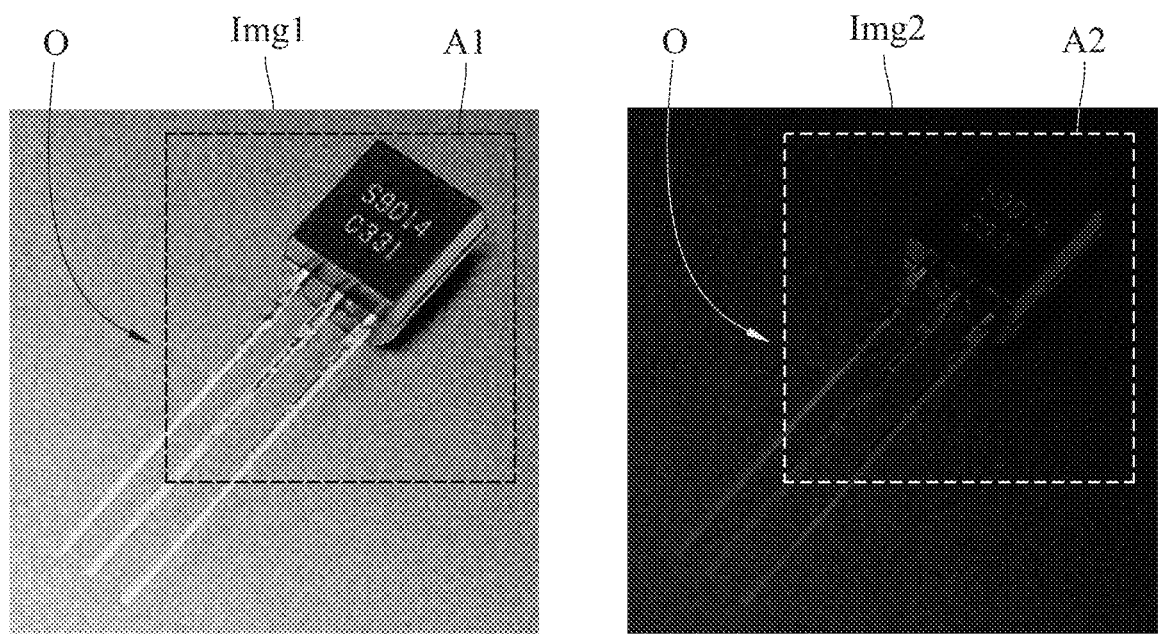
FIG. 1B is a schematic diagram showing the first image and the second image.

Take FIG. 1A as an example, the computing device 30 is preferably used to control the projecting parameters of the projecting device 10 to the target object O, and interpret the images comprising at least a part of the target object O that is obtained by the image obtaining device 20 (for example, the first image Img1 and the second image Img2 as shown in FIG. 1B). The computing device 30 is preferably further used to determine whether to adjust the projecting parameters of the projecting device 10, thereby obtaining images comprising at least part of the target object O suitable for performing 3D point cloud reconstruction. The detailed implementation of the computing device 30 interpreting the image obtained by the image obtaining device 20 and adjust the projecting parameters of the projecting device 10 is described below.

Figure 2:
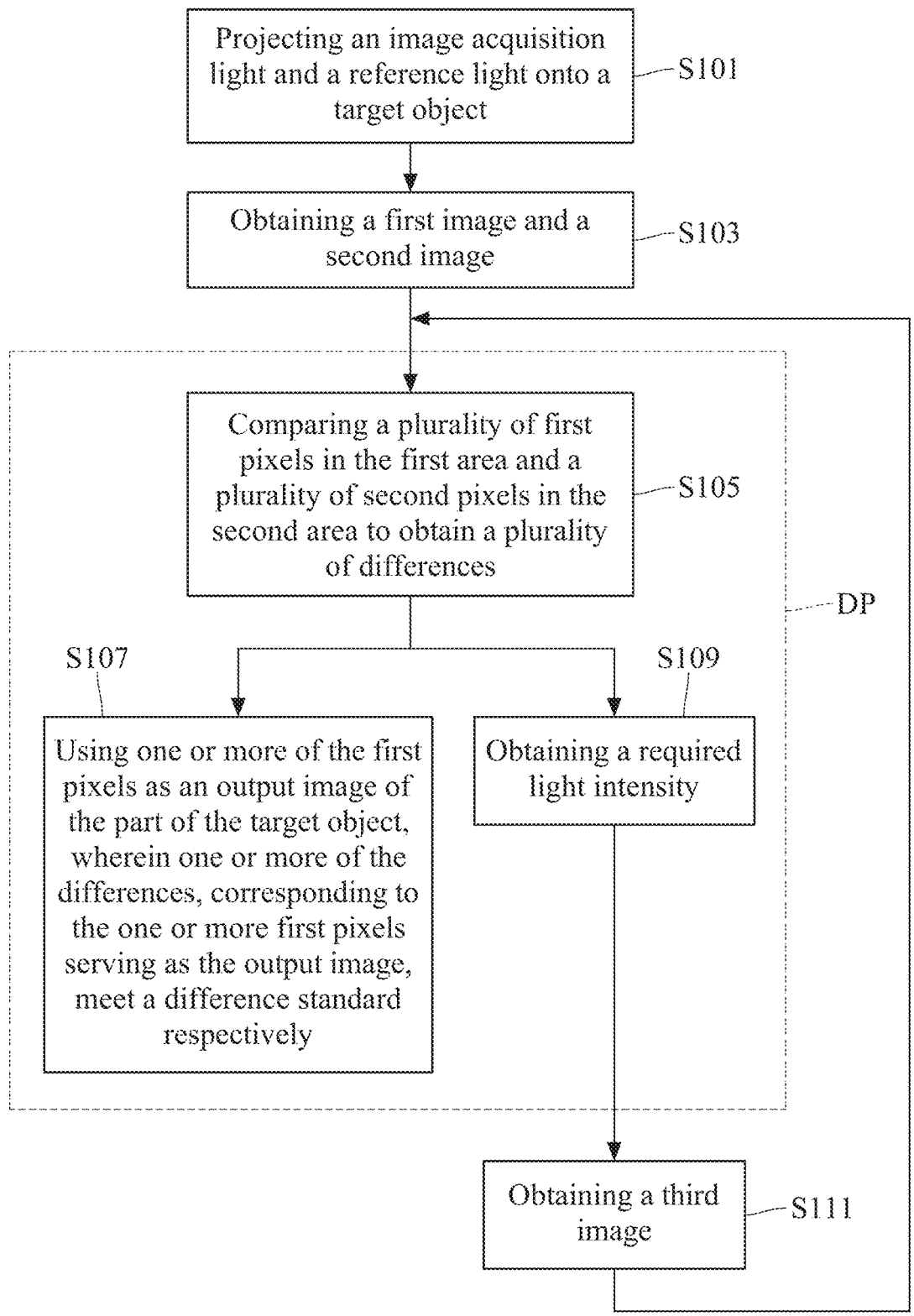
FIG. 2 is a flow chart of an image obtaining method according to one or more embodiments of the present disclosure.

Please refer to both FIG. 1A and FIG. 2, wherein FIG. 2 is a flow chart of an image obtaining method according to one or more embodiments of the present disclosure.

Step S101 is: projecting an image acquisition light and a reference light onto a target object; step S103 is: obtaining a first image and a second image.

It should be noted that, the light intensity of the image acquisition light is higher than that of the reference light. The projecting device 10 separately projects the image acquisition light and the reference light to the target object O. That is, the projecting device 10 may first project the image acquisition light onto the target object O for the image obtaining device 20 to obtain the first image, then project the reference light onto the target object O for the image obtaining device 20 to obtain the second image. The projecting device 10 may also first project the reference light onto the target object O for the image obtaining device 20 to obtain the second image, then project the image acquisition light onto the target object O for the image obtaining device 20 to obtain the first image. That is, the time of the projecting device 10 projecting the image acquisition light and the time of the projecting device 10 projecting the reference light do not overlap with each other. The present disclosure does not limit the order in which the projecting device 10 projects the reference light and the image acquisition light.

Please refer to FIG. 1B, FIG. 1B is a schematic diagram showing the first image and the second image. The target object O in the first image Img1 is projected by the image acquisition light, and the target object O in the second image Img2 is projected by the reference light, and the brightness of the first image Img1 is different from the brightness of the second image Img2.

Please continue referring to FIG. 1B and step S103, the first image Img1 and the second image Img2 obtained by the image obtaining device 20 both comprise the image of the target object O, and the first image Img1 has a first area A1 containing a part of the target object O, and the second image Img2 has a second area A2 containing the part of the target object O. The sizes of the first area A1 and the second area A2 shown in FIG. 1B are merely examples. That is, the first image Img1 and the second image Img2 may both contain the entire transistor (target object O), or only contain the package of the transistor or the pins of the transistor, the present disclosure is not limited thereto. After obtaining the first image Img1 and the second image Img2, the computing device 30 may perform a difference evaluation procedure DP, wherein the difference evaluation procedure DP may comprise steps S105, S107 and S109 as described below.

Step S105 is: comparing a plurality of first pixels in the first area with a plurality of second pixels in the second area to obtain a plurality of differences.

After the computing device 30 obtains the first image Img1 and the second image Img2 from the image obtaining device 20, a plurality of first pixels in the first area A1 of the first image Img1 and a plurality of second pixels in the second area A2 of the second image Img2 are compared with each other to obtain a plurality of differences.

In other word, since the first area A1 and the second area A2 are the same area in different images, the first pixels contained in the first area A1 each corresponds to one of the second pixels in the second area A2. Accordingly, the computing device 30 may compare the brightness of the first pixels with the corresponding second pixels to obtain the plurality of differences.

Specifically, the computing device 30 may calculate the plurality of differences by using a brightness difference equation, the brightness difference equation is:

$$\Delta J = \sum_i \sum_j J_1(A(p_{ij}), d, t_1, L_1) - \sum_i \sum_j J_2(A(p_{ij}), d, t_2, L_2)$$

wherein $\Delta J$ is the plurality of differences; $P_{ij}$ is a pixel number of each of the first pixels and each of the second pixels; A is a brightness of each of the first pixels and each of the second pixels; d is a distance between the projecting device 10 and the target object O or a distance between the image obtaining device 20 and the target object O; $t_1$ is a first exposure time (a time period) of the first image Img1, meaning the exposure time of the image obtaining device 20 obtaining the first image Img1; $t_2$ is a second exposure time (a time period) of the second image Img2, meaning the exposure time of the image obtaining device 20 obtaining the second image Img2; $L_1$ is the amount of light of the image acquisition light projected by the projecting device 10, or the amount of light entering the image obtaining device 20 when obtaining the first image Img1; $L_2$ is the amount of light of the reference light projected by the projecting device 10, or the amount of light entering the image obtaining device 20 when obtaining the second image Img2. As described above, when $L_1$ and $L_2$ both are the amount of projection light (the image acquisition light and the reference light), $L_1$ and $L_2$ are different from each other.

Step S107 is: using one or more of the first pixels, corresponding to one or more differences meeting the difference standard, as an output image of the part of the target object.

The computing device 30 may use one or more of the first pixels as the output image of the part of the target object O, wherein one or more of the differences, corresponding to the one or more first pixels serving as the output image of the part of the target object O, meet the difference standard respectively. The one or more first pixels serving as the output image of the part of the target object O are the pixels suitable for performing 3D point cloud reconstruction. The detailed explanation of the computing device 30 determining whether the differences meet the difference standard will be described along with the embodiments of FIGS. 3 and 4.

Please refer to step S109: obtaining a required light intensity.

That is, for the first pixels corresponding to the differences not meeting the difference standard, the computing device 30 needs to adjust the projection light intensity of the projecting device 10 to a required light intensity based on a required amount and selectively outputs the required light intensity. Accordingly, the computing device 30 is able to obtain another image (the third image described below) based on the required light intensity. In other words, in condition one, the computing device 30 may output the required light intensity to control the projection light intensity of the projecting device 10; in condition two, the computing device 30 may directly select another image from a plurality of pre-stored images based on the required light intensity. Therefore, the computing device 30 may obtain the required light intensity based on the amount of pixels required for performing 3D point cloud reconstruction, and in condition one, the required light intensity is the projection light intensity when the projecting device 10 performs the next projection.

For better understanding, the image acquisition light described above will be referred to as a first image acquisition light, and another image acquisition light corresponding to the required light intensity will be referred to as a second image acquisition light.

Step S111 is: obtaining a third image.

After the projection light intensity of the projecting device 10 is adjusted to the required light intensity and the corresponding second image acquisition light is projected onto the target object O, the third image may be obtained. That is, the third image is an image containing the target object O, and the target object O in the third image is projected by the second image acquisition light.

After obtaining the third image, the computing device 30 may update the first image Img1 by the third image, and perform the difference evaluation procedure DP as described above on the updated first image (the third image), wherein the light intensity of the second image acquisition light is different from the light intensity of both the first image acquisition light and the light intensity of the reference light. When performing the difference evaluation procedure DP on the updated first image (the third image), the amount of differences, corresponding to the third image, that meet the difference standard is the abovementioned required amount.

According to the embodiment shown by FIG. 2, even if the target object O is an object having a reflective surface and/or a light-absorbing surface causing the initially obtained image not being suitable for 3D cloud point reconstruction, the computing device 30 may still obtain the third image more suitable for subsequent 3D cloud point reconstruction, at the same time avoid point cloud breakage caused by the reflective surface and/or the light-absorbing surface of the target object O. Therefore, when the image obtaining method of the present disclosure is used for tracking the workpiece on the production line, the location and condition of the workpiece may be accurately detected.

Figure 3:
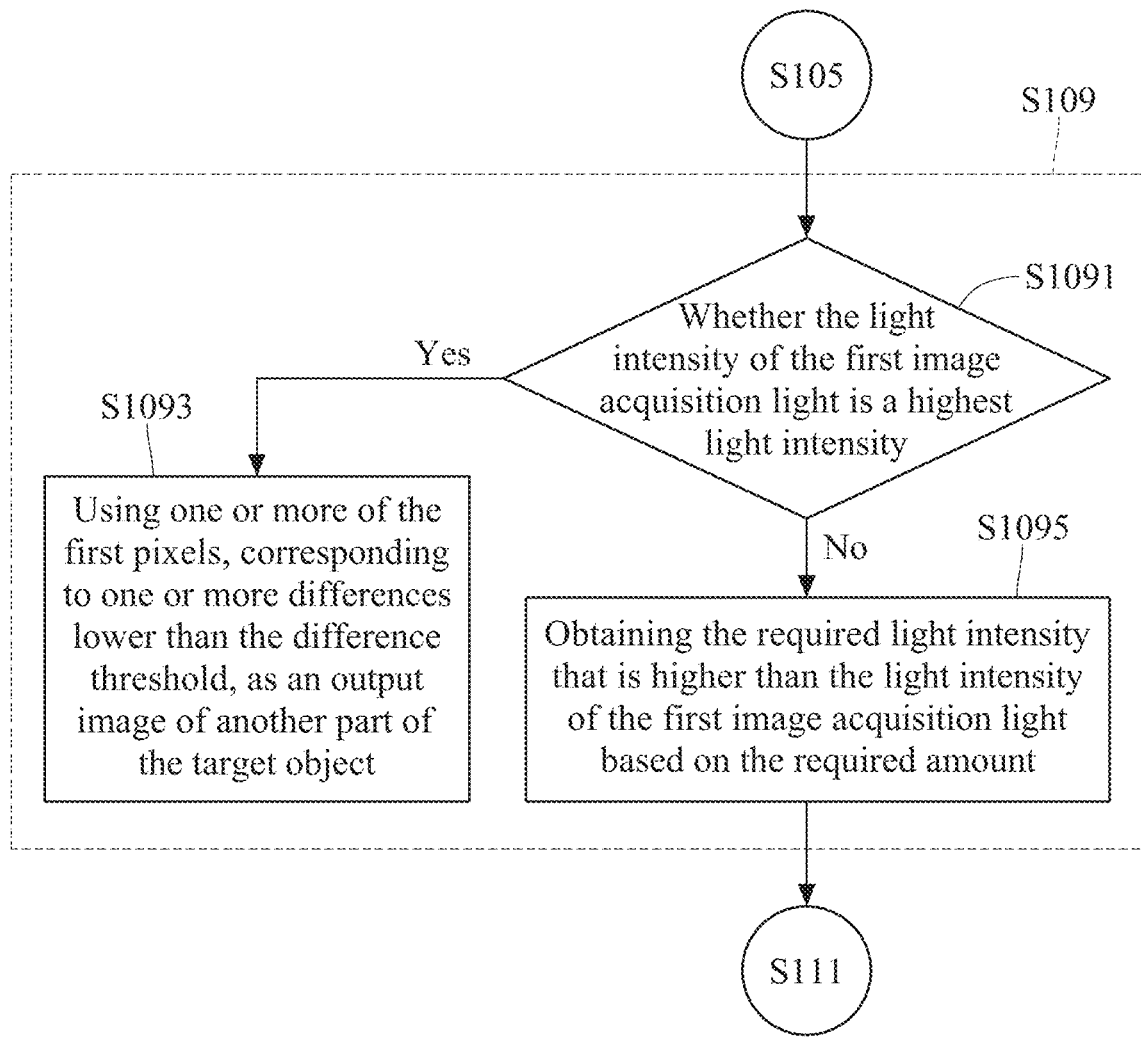
FIG. 3 is a detailed flow chart of an image obtaining method according to an embodiment of the present disclosure.

Please refer to FIGS. 1A, 1B and 3, wherein FIG. 3 is a detailed flow chart of an image obtaining method according to an embodiment of the present disclosure, that is, FIG. 3 illustrates one of the implementation methods of step S109 in FIG. 2.

It should first be noted that, the difference standard described in step S107 of FIG. 2 may be: the differences being higher than a difference threshold. That is, in this embodiment, determining whether each one of the differences meets the difference standard is determining whether each one of the differences is higher than the difference threshold. The first pixels with differences higher than the difference threshold may be used as the output image of the part of the target object O, wherein the difference threshold is used as a basis for determining whether the difference in brightness between two pixels reaches the expected value.

Therefore, when the first pixels with the differences that do not reach the difference threshold are determined, step S1091 is then performed. Step S1091 is: determining whether the light intensity of the first image acquisition light is the highest light intensity.

Specifically, when a difference does not reach the difference threshold, it means the brightness of the corresponding first pixel might be insufficient. When the brightness of the first pixel is insufficient, the 3D image obtained by subsequent 3D point cloud reconstruction may not be accurate enough. For example, the light-absorbing surface of the target object O causes part of the first pixels being too dark, and these first pixels are the pixels corresponding to differences not meeting the difference standard. Therefore, the computing device 30 may directly increase the light intensity of the first image acquisition light by a predetermined interval, or increase the light intensity of the first image acquisition light by the following step S1095. The computing device 30 may then use the light intensity of the increased image acquisition light as the required light intensity to obtain the third image based on the increased image acquisition light corresponding to the required light intensity. Therefore, before increasing the light intensity of the first image acquisition light, the computing device 30 may first determine whether the light intensity of the first image acquisition light is the highest light intensity, to determine whether there is room for increasing the light intensity of the first image acquisition light.

When the light intensity of the first image acquisition light is already the highest light intensity, the computing device 30 may first perform step S1093: using one or more of the first pixels, corresponding to one or more differences lower than the difference threshold, as an output image of another part of the target object.

In other words, since the light intensity of the first image acquisition light is already the highest light intensity, comparing to step S107 in FIG. 2, step S1093 in FIG. 3 uses the rest of the first pixels, corresponding to differences not reaching the difference threshold, as another output image of another part of the target object O. In addition, when the light intensity of the first image acquisition light is already the highest light intensity, the computing device 30 may also end the method, and only perform 3D point cloud reconstruction on the first pixels corresponding to differences higher than the difference threshold.

When the light intensity of the first image acquisition light is not the highest light intensity, it means there is still room for increasing the light intensity of the first image acquisition light. Therefore, the computing device 30 may perform step S1095 in order to control the projecting device 10 to obtain the required light intensity that is higher than the light intensity of the first image acquisition light.

Step S1095: obtaining the required light intensity that is higher than the light intensity of the first image acquisition light according to the required amount.

When it is determined in step S1091 that the light intensity of the first image acquisition light is not the highest light intensity, the computing device 30 may obtain the required light intensity that is higher than the light intensity of the first image acquisition light according to the required amount, and the sum of the required amount and the amount of first pixels outputted in step S107 falls within a threshold amount, wherein the required amount is the basis for the computing device 30 adjusting the light intensity of the first image acquisition light.

For example, assuming that the first area A1 has total of 100 first pixels and the threshold amount is 90%, and the amount of first pixels corresponding to differences reaching the difference threshold (in step S107) is 60, then the required amount is at least 75% of the rest 40 first pixels (at least 30% of the 100 first pixels). Therefore, the sum of the amount of first pixels corresponding to differences reaching the difference threshold and the required amount of the first pixels falls within the 90% threshold amount. Accordingly, when the light intensity of the first image acquisition light does not reach the highest light intensity, the computing device 30 may adjust the light intensity of the first image acquisition light according to the required amount, so that the amount of differences equal to or higher than the threshold amount may be at least 90% of all the first pixels in the first area A1.

In addition, obtaining the required light intensity that is higher than the light intensity of the first image acquisition light according to the required amount may also be implemented by a light intensity-increasing equation to calculate the required light intensity, wherein the light intensity-increasing equation is:

$$P_{adj} = P_o \times \left(1 + \left(\frac{3}{2}\right)^{-k}\right)$$

wherein $P_{adj}$ is the required light intensity, $P_o$ is the light intensity of the image acquisition light, and k is the required amount (the 75% described the previous example).

Accordingly, step S111 may be performed to obtain the third image. That is, the projecting device 10 projects the second image acquisition light with the required light intensity onto the target object O, for the image obtaining device 20 to obtain the third image.

Figure 4:
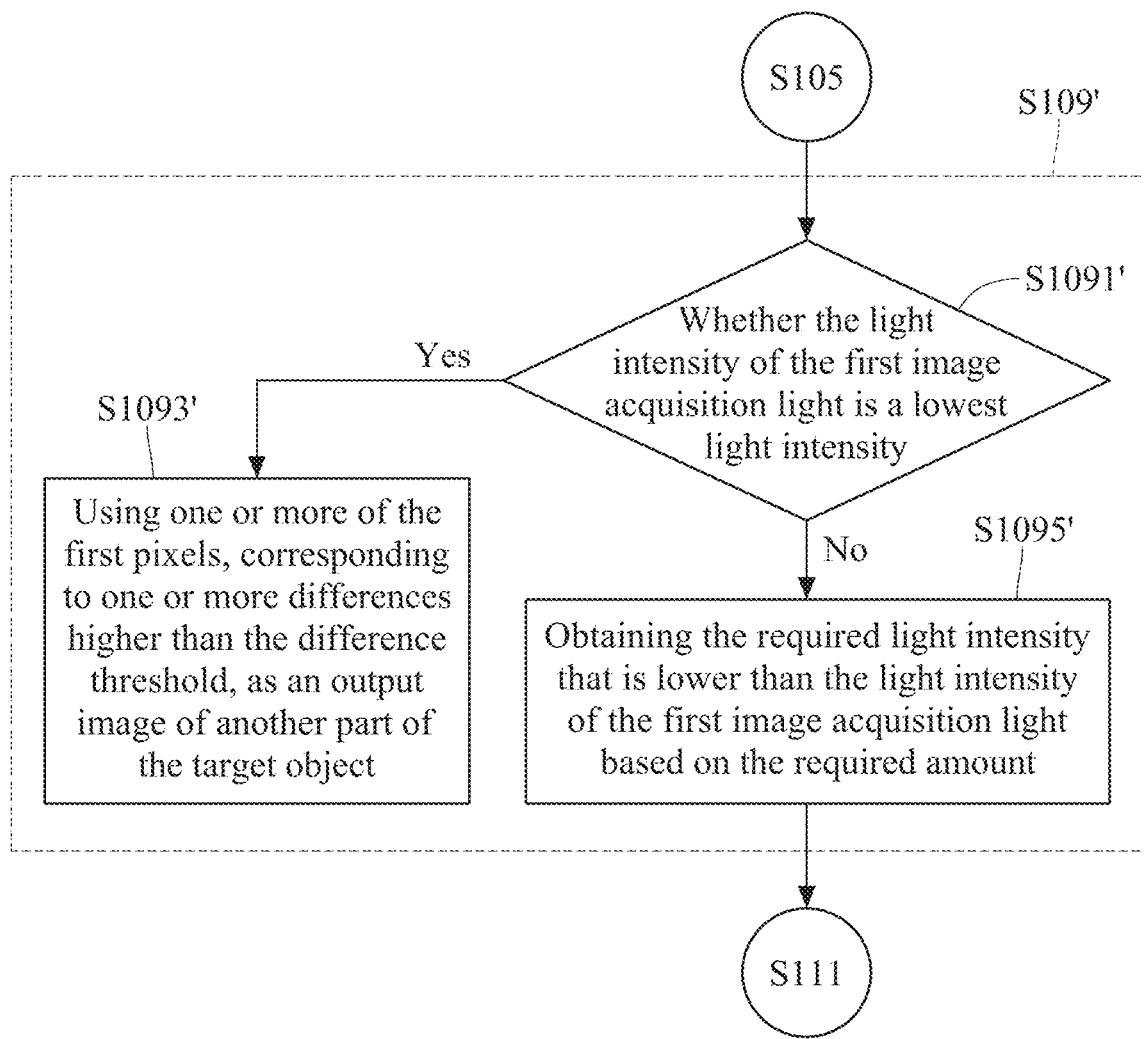
FIG. 4 is a flow chart of an image obtaining method according to another embodiment of the present disclosure.

Please refer to both FIGS. 1A, 1B and 4, wherein FIG. 4 is a flow chart of an image obtaining method according to another embodiment of the present disclosure. That is, step S109' illustrated in FIG. 4 is another embodiment of step S109 of FIG. 2.

The difference between FIG. 3 and FIG. 4 is that: the embodiment of FIG. 3 is applied on a condition with the light intensity of the image acquisition light is relative close to the light intensity of the reference light (meaning the required light intensity has to be higher than the light intensity of the image acquisition light), and the embodiment of FIG. 4 is applied on a condition with the light intensity of the image acquisition light is significantly higher than the light intensity of the reference light (meaning the required light intensity has to be lower than the light intensity of the image acquisition light). In the embodiment of FIG. 4, the difference standard described in step S107 of FIG. 2 may be: the differences are higher than a difference threshold. That is, the difference threshold in the embodiment of FIG. 4 is different from the difference threshold in the embodiment of FIG. 3, and determining whether each of the differences meets the difference threshold in the embodiment of FIG. 4 is determining whether each of the differences is lower than the difference threshold, and the first pixels corresponding to differences lower than the difference threshold may be used an output image of a part of the target object O. The difference threshold is used as a basis for determining whether the difference in brightness between two pixels reaches the expected value.

In another embodiment, also for the case where the light intensity of the image acquisition light is relatively much larger than the light intensity of the reference light, the way of obtaining the differences described in step S105 may also be first subtracting the brightness of each one of the first pixels from the brightness of each one of the second pixels to obtain a plurality of initial differences, then subtracting each one of the initial differences from a displayable maximum light intensity to obtain a plurality of negative film differences. The negative film differences are then used as the differences. The displayable maximum light intensity is the highest light intensity that can be displayed by a display device. Therefore, in this embodiment, the difference standard is the differences being higher than the difference threshold.

Therefore, when the first pixels corresponding to differences reaching the difference threshold or corresponding to differences (negative film differences) not reaching the difference threshold are determined, step S1091' is performed. Step S1091' is: determining whether the light intensity of the first image acquisition light is a lowest light intensity.

Specifically, when the differences reach the difference threshold or the negative film differences does not reach the difference threshold, it means that the corresponding first pixels are too bright. When the first pixels are too bright, the 3D image obtained by subsequent 3D point cloud reconstruction may not be accurate enough. For example, the reflective surface of the target object O causing the brightness of part of the first pixels being too bright, and the bright first pixels are the pixels with the differences that already reach the difference standard, or with the negative film differences that do not reach the difference standard. Therefore, the computing device 30 may directly decrease the light intensity of the first image acquisition light by a predetermined interval, or decrease the light intensity of the first image acquisition light by the following step S1095'. The computing device 30 may then use the light intensity of the decreased image acquisition light as the required light intensity to obtain the third image based on the image acquisition light corresponding to the required light intensity. Therefore, before decreasing the light intensity of the first image acquisition light, the computing device 30 may first determine whether the light intensity of the first image acquisition light is the lowest light intensity, to determine whether there is room for decreasing the light intensity of the first image acquisition light, wherein the lowest light intensity is not lower than the light intensity of the reference light.

When the light intensity of the first image acquisition light is already the lowest light intensity, the computing device 30 may first perform step S1093': using one or more of the first pixels, corresponding to one or more differences lower than the threshold difference, as an output image of another part of the target object.

In other words, since the light intensity of the first image acquisition light is already the lowest light intensity, comparing to step S107 in FIG. 2, step S1093' in FIG. 4 uses the rest of the first pixels, corresponding to differences reaching the difference threshold, or corresponding to negative film differences noting reach the difference threshold, as another output image of another part of the target object O. In addition, when the light intensity of the first image acquisition light is determined as the lowest light intensity, the computing device 30 may also end the method, and only perform 3D point cloud reconstruction on the first pixels corresponding to differences not reaching the difference threshold, or corresponding to negative film differences reaching the difference threshold.

When the light intensity of the first image acquisition light is not the lowest light intensity, it means there is still room for decreasing the light intensity of the first image acquisition light. Therefore, the computing device 30 may perform step S1095' in order to control the projecting device 10 to obtain the required light intensity that is lower than the light intensity of the first image acquisition light.

Step S1095': obtaining the required light intensity that is lower than the light intensity of the first image acquisition light according to the required amount.

When it is determined in step S1091' that the light intensity of the first image acquisition light is not the lowest light intensity, the computing device 30 may obtain the required light intensity that is lower than the light intensity of the first image acquisition light according to the required amount, and the sum of the required amount and the amount of first pixels outputted in step S107 falls within a threshold amount, wherein the required amount is the basis for the computing device 30 adjusting the light intensity of the first image acquisition light.

For example, assuming the first area A1 has total of 100 first pixels and the threshold amount is 90%, and the amount of first pixels corresponding to differences being lower than the difference threshold (in step S107) is 60, then the required amount is at least 75% of the rest 40 first pixels (at least 30% of the 100 first pixels) corresponding to differences already reach the difference threshold. Therefore, the sum of the amount of first pixels corresponding to differences lower than the difference threshold and the required amount of the first pixels falls within the 90% threshold amount. Accordingly, when the light intensity of the first image acquisition light is not the lowest light intensity, the computing device 30 may adjust the light intensity of the first image acquisition light according to the required amount, so that the amount of differences lower than the threshold amount may be at least 90% of all the first pixels in the first area A1.

In addition, obtaining the required light intensity that is lower than the light intensity of the first image acquisition light according to the required amount may also be implemented by a light intensity-decreasing equation to calculate the required light intensity, wherein the light intensity-decreasing equation is:

$$P_{adj} = P_o \times \left(1 + \left(\frac{3}{2}\right)^{-k}\right)$$

wherein $P_{adj}$ is the required light intensity, $P_o$ is the light intensity of the image acquisition light, and k is the required amount (the 75% described the previous example).

Accordingly, step S111 may be performed to obtain the third image. That is, the projecting device 10 projects the second image acquisition light with the required light intensity onto the target object O, for the image obtaining device 20 to obtain the third image.

To sum up the description of FIGS. 3 and 4, when the projection light intensity of the projecting device 10 needs to be increased, and the light intensity of the first image acquisition light is not the highest light intensity, the computing device may obtain the required light intensity according to the required amount after the computing device 30 has computed the required amount of the corresponding first pixels with differences not meeting the difference standard. The required light intensity is higher than the light intensity of the first image acquisition light, so as to increase the projection light intensity of the projecting device 10 to obtain a more proper output image. On the other hand, when the projection light intensity of the projecting device 10 needs to be lowered, and the light intensity of the first image acquisition light is not the lowest light intensity, the computing device 30 may obtain the required light intensity according to the required amount after the computing device 30 has computed the required amount of the corresponding first pixels with differences not meeting the difference standard. The required light intensity is lower than the light intensity of the first image acquisition light, so as to lower the projection light intensity of the projecting device 10 to obtain a more proper output image.

Please then refer to below description of condition two, wherein condition two preferably also adopts the image obtaining system shown in FIG. 1A. The way of obtaining the third image in condition two is by selecting one of a plurality of pre-stored images as the third image. The implementation of condition two will be described below.

Please refer to FIG. 2 again. It should first be noted that, the pre-stored images are image containing the target object O, and the target object O in the pre-stored images are respectively projected by multiple different image acquisition lights on the target object O. Therefore, the computing device 30 may perform steps S101 and S103, and perform the difference evaluation procedure DP on the first image Img1 and the second image Img2, wherein the first image for performing the difference evaluation procedure DP is one of the pre-stored images.

Then, after the differences between the first pixels in the first image Img1 and the second pixels in the second image Img2 are computed by performing the difference evaluation procedure DP, step S107 (using one or more of the first pixels, corresponding to differences meeting the difference standard, as an output image of the part of the target object O) may be performed. On the contrary, for the rest of the first pixels, corresponding to differences not meeting the difference standard, the computing device 30 may perform step S109 to obtain the required light intensity, and obtain the third image in step S111.

Different from condition one, the way of obtaining the third image in condition two is to select one of the pre-stored images as the third image as described above, and the computing device may use the pre-stored image corresponding to the light intensity of the image acquisition light that is closest to the required light intensity, among the multiple image acquisition light as the third image. For example, when the multiple image acquisition light, when the one closest to the required light intensity is the second image acquisition light, the computing device 30 may use the pre-stored image corresponding to the second image acquisition light as the third image.

Specifically, since the target object O in these pre-stored images are respectively projected by various image acquisition light (meaning different projection light intensity), and among the various image acquisition light, the light intensity of the second image acquisition light is the closest to the required light intensity, the computing device 30 may use the pre-stored image corresponding to the second image acquisition light as the third image.

Further, in the case where the light intensity of the image acquisition light is relative close to the light intensity of the reference light, the difference standard described in step S107 of FIG. 2 may be: the differences are higher than the difference threshold. For the first pixels corresponding to differences higher than the difference threshold, these first pixels are distinguishable enough for performing 3D point cloud reconstruction. For the first pixels corresponding to differences that do not reach the difference threshold, these first pixels are too dark. That is, the first pixels corresponding to differences that do not reach the difference threshold may contain the light-absorbing surface of the target object O, causing the first pixels being too dark.

Therefore, in the case where the light intensity of the image acquisition light is relative close to the light intensity of the reference light, in condition two, the way of the computing device 30 obtaining the required light intensity may be directly obtaining another light intensity that is higher than the light intensity of the first image acquisition light by a predetermined interval, and using the another light intensity as the required light intensity. The way of the computing device 30 obtaining the required light intensity may also be performing the sub-steps shown in FIG. 3 as described, and using the light intensity-increasing equation to compute the required light intensity. The detail implementation of FIG. 3 will not be further elaborated here.

Furthermore, the difference standard described in step S107 of FIG. 2 may also be: the differences being lower than the difference threshold. For the first pixels corresponding to differences lower than the difference threshold, these first pixels are distinguishable enough for performing 3D point cloud reconstruction. For the first pixels corresponding to differences that already reach the difference threshold, these first pixels are too bright. That is, the first pixels corresponding to differences that already reach the difference threshold may contain the reflective surface of the target object O, causing the first pixels being too bright. Further, as described above, in another embodiment, the way of obtaining the differences may be subtracting the brightness of each one of the first pixels from the brightness of each one of the second pixels to obtain a plurality of initial differences (the amount of initial differences should be the same as that of the first pixels), then subtracting each one of the initial differences from a displayable maximum light intensity to obtain a plurality of negative film differences. The negative film differences may be used as the differences. Therefore, if said differences are the negative film differences, the difference standard is the differences being higher than the difference threshold.

Therefore, the way of the computing device 30 obtaining the required light intensity may be directly obtaining another light intensity that is lower than the light intensity of the first image acquisition light by a predetermined interval, and using the another light intensity as the required light intensity. The way of the computing device 30 obtaining the required light intensity may also be performing the sub-steps shown in FIG. 4 as described, and using the light intensity-decreasing equation to compute the required light intensity. The detail implementation of FIG. 4, which is already described above, will not be further elaborated here.

In short, in condition two, after the first pixels corresponding to differences not meeting the difference standard are determined by the computing device 30, the embodiments of FIG. 3 or 4 may be performed to obtain the required light intensity; the computing device 30 may also use the light intensity that is higher or lower than the light intensity of the first image acquisition light by a predetermined interval as the required light intensity, and use the pre-stored image corresponding the second image acquisition light of the required light intensity as the third image.

In sum of the above two ways of obtaining the required light intensity, the image obtaining method of the present disclosure may perform the difference evaluation procedure DP after respectively obtaining the first image Img1 and Img2. For the first pixels corresponding to differences determined as not meeting the difference standard in the difference evaluation procedure DP, the projection light intensity of the projecting device 10 may be adjusted to obtain the required light intensity and the third image. The image obtaining method of the present disclosure may also be projecting multiple image acquisition light with different light intensity onto the target object to obtain a plurality of pre-stored images and obtaining the second image with the reference light in advance, and performing the difference evaluation procedure DP on the pre-stored images and the second image after obtaining enough images.

In view of the above description, the image obtaining method according to one or more embodiments of the present disclosure, the projection light intensity of the projecting device may be adaptively adjusted for different workpieces and different surface materials. Therefore, when the target object has a reflective surface, whether to lower the projection light intensity of the projecting device may be determined according to the present disclosure. Further, when the projection light intensity of the projecting device needs to be lowered, according to one or more embodiments of the present disclosure, a suitable adjusting parameter may be calculated. Similarly, when the target object has a light-absorbing surface, whether to increase the projection light intensity of the projecting device may be determined according to the present disclosure. Further, when the projection light intensity of the projecting device needs to be increased, according to one or more embodiments of the present disclosure, a suitable adjusting parameter may be calculated.

The present disclosure has been disclosed above in the embodiments described above, however it is not intended to limit the present disclosure. It is within the scope of the present disclosure to be modified without deviating from the essence and scope of it. It is intended that the scope of the present disclosure is defined by the following claims and their equivalents.

What is claimed is:

1. An image obtaining method, comprising:
   by a projecting device, separately projecting an image acquisition light and a reference light onto a target object, wherein a light intensity of the image acquisition light is higher than a light intensity of the reference light;
   by an image obtaining device, obtaining a first image and a second image, both the first image and the second image comprising the image of the target object, with the target object of the first image being illuminated by the image acquisition light, and the target object of the second image being illuminated by the reference light, wherein the first image has a first area including a part of the target object, and the second image has a second area including the part of the target object; and
   by a computing device, performing a difference evaluation procedure, the difference evaluation procedure comprising:
   comparing brightness of a plurality of first pixels in the first area with brightness of a plurality of second pixels in the second area, with the plurality of second pixels corresponding to the plurality of first pixels, to obtain a plurality of differences;
   using one or more of the first pixels as an output image of the part of the target object, wherein one or more of the differences, corresponding to the one or more first pixels serving as the output image, meet a difference standard respectively; and obtaining and selectively outputting a required light intensity that is higher or lower than the light intensity of the image acquisition light based on a required amount of a number of first pixels with differences, among said differences, not meeting the difference standard, wherein a sum of the required amount and the amount of the first pixels with the differences meeting the difference standard falls within a threshold range.

2. The image obtaining method according to claim 1, wherein the image acquisition light is a first image acquisition light, and after obtaining the required light intensity, the method further comprises:

obtaining a third image, the third image being an image comprising the target object, and the target object in the third image being illuminated by a second image acquisition light, wherein a light intensity of the second image acquisition light is associated with the required light intensity; and updating the first image by the third image and performing the difference evaluation procedure, wherein the light intensity of the second image acquisition light is different from the light intensity of the first image acquisition light and the light intensity of the reference light.

3. The image obtaining method according to claim 2, wherein obtaining the third image comprises:

selecting one of a plurality of pre-stored images as the third image, wherein the pre-stored images are images comprise the target object, the pre-stored images are generated by respectively projecting multiple image acquisition lights on the target object, and the light intensity of the second image acquisition light is the closest to the required light intensity among the multiple image acquisition lights.

4. The image obtaining method according to claim 2, wherein obtaining the third image comprises:

projecting the second image acquisition light onto the target object; and obtaining an image of the target object, which is illuminated by the second image acquisition light, by the image obtaining device to obtain the third image.

5. The image obtaining method according to claim 2, wherein a light intensity of the required light intensity is higher than the light intensity of the first image acquisition light.

6. The image obtaining method according to claim 2, wherein a light intensity of the required light intensity is lower than the light intensity of the first image acquisition light.

7. The image obtaining method according to claim 1, wherein the difference standard is: the differences are higher than a difference threshold, and comparing the brightness of the plurality of first pixels in the first area with the brightness of the plurality of second pixels in the second area, with the plurality of second pixels corresponding to the plurality of first pixels, to obtain the differences comprises:

subtracting the brightness of each one of the first pixels with the brightness of each one of the second pixels to obtain a plurality of initial differences; and subtracting each one of the initial differences from a displayable maximum light intensity to obtain a plurality of negative film differences, and using the negative film differences as the differences, and obtaining the required light intensity based on the required amount comprises:

obtaining the required light intensity that is lower than the light intensity of the image acquisition light based on the required amount.

8. The image obtaining method according to claim 7, wherein obtaining the required light intensity that is lower than the light intensity of the image acquisition light based on the required amount comprises: calculating the required light intensity using a light intensity-decreasing equation, wherein the light intensity-decreasing equation is:

$$P_{adj} = P_o \times \left(1 + \left(\frac{3}{2}\right)^{-k}\right)$$

wherein $P_{adj}$ is the required light intensity, $P_o$ is the light intensity of the image acquisition light, and k is the required amount.

9. The image obtaining method according to claim 1, wherein the difference standard is: the differences are higher than a difference threshold, and obtaining the required light intensity based on the required amount comprises:

obtaining the required light intensity that is higher than the light intensity of the image acquisition light based on the required amount.

10. The image obtaining method according to claim 9, wherein before obtaining the required light intensity that is higher than the light intensity of the image acquisition light based on the required amount, the method further comprises:

determining whether the light intensity of the image acquisition light is a highest light intensity; and using one or more of the first pixels, corresponding to one or more differences lower than the difference threshold, as an output image of another part of the target object when the light intensity of the image acquisition light is determined as the highest light intensity.

11. The image obtaining method according to claim 9, wherein obtaining the required light intensity that is higher than the light intensity of the image acquisition light based on the required amount comprises: calculating the required light intensity using a light intensity-increasing equation, wherein the light intensity-increasing equation is:

$$P_{adj} = P_o \times \left(1 + \left(\frac{3}{2}\right)^{-k}\right)$$

wherein $P_{adj}$ is the required light intensity, $P_o$ is the light intensity of the image acquisition light, and k is the required amount.

12. The image obtaining method according to claim 1, wherein the difference standard is: the differences are lower than a difference threshold, and obtaining the required light intensity based on the required amount comprises:

obtaining the required light intensity that is lower than the light intensity of the image acquisition light based on the required amount.

13. The image obtaining method according to claim 12, wherein before obtaining the required light intensity that is lower than the light intensity of the image acquisition light based on the required amount, the method further comprises:

determining whether the light intensity of the image acquisition light is a lowest light intensity; and using one or more of the first pixels, corresponding to one or more differences higher than the difference threshold, as an output image of another part of the target object when the light intensity of the image acquisition light is determined as the lowest light intensity.

14. The image obtaining method according to claim 12, wherein obtaining the required light intensity that is lower than the light intensity of the image acquisition light based on the required amount comprises: calculating the required light intensity using a light intensity-decreasing equation, wherein the light intensity-decreasing equation is:

$$P_{adj} = P_o \times \left(1 + \left(\frac{3}{2}\right)^{-k}\right)$$

wherein $P_{adj}$ is the required light intensity, $P_o$ is the light intensity of the image acquisition light, and k is the required amount.

15. The image obtaining method according to claim 1, wherein comparing the plurality of first pixels in the first area with the plurality of second pixels in the second area, with the plurality of second pixels corresponding to the plurality of first pixels, to obtain the plurality of differences comprises: calculating the plurality of differences using a brightness difference equation, wherein the brightness difference equation is:

$$\Delta J = \sum_i \sum_j J_1(A(p_{ij}), d, t_1, L_1) - \sum_i \sum_j J_2(A(p_{ij}), d, t_2, L_2)$$

wherein $\Delta J$ is the plurality of differences, $p_{ij}$ is a pixel number of each of the first pixels and each of the second pixels, A is the brightness of each of the first pixels and each of the second pixels, d is a distance between the projecting device and the target object or a distance between the image obtaining device and the target object, $t_1$ is a first exposure time of the first image, $t_2$ is a second exposure time of the second image, $L_1$ is the amount of light of the image acquisition light projected by the projecting device, or the amount of light entering the image obtaining device when obtaining the first image, $L_2$ is the amount of light of the reference light projected by the projecting device, or the amount of light entering the image obtaining device when obtaining the second image.

\* \* \* \* \*